United States Patent [19]

Saito et al.

[11] Patent Number: 4,789,585

[45] Date of Patent: Dec. 6, 1988

[54] HEAT TRANSFER BLOCK FOR CROSS FLOW HEAT EXCHANGER

[75] Inventors: Naohide Saito, Niigata; Junichi Tamura, Yokohama; Masaji Kurosawa, Inba; Isao Terada, Yokohama, all of Japan

[73] Assignee: Nippon Oil Co. Ltd., Tokyo, Japan

[21] Appl. No.: 62,725

[22] Filed: Jun. 15, 1987

[30] Foreign Application Priority Data

Jun. 19, 1986 [JP] Japan .................................. 61-1414196

[51] Int. Cl.$^4$ .......................... B32B 3/28; F28F 19/00
[52] U.S. Cl. .................................. 428/185; 428/184; 428/186; 165/134.1; 165/165
[58] Field of Search ............... 428/117, 178, 179, 185, 428/186; 165/134.1, 165, 95, 5

[56] References Cited

U.S. PATENT DOCUMENTS

| | | | |
|---|---|---|---|
| 4,027,447 | 6/1977 | Granger et al. | 428/185 |
| 4,041,591 | 8/1977 | Noll et al. | 428/117 |
| 4,340,403 | 7/1982 | Higuchi et al. | 428/117 |
| 4,364,760 | 12/1982 | Higuchi et al. | 428/117 |
| 4,411,856 | 10/1983 | Montierth | 428/117 |
| 4,455,180 | 6/1984 | Hillman et al. | 428/117 |
| 4,460,388 | 7/1984 | Fukami et al. | 428/185 |

Primary Examiner—John E. Kittle
Assistant Examiner—B. A. Bozzelli
Attorney, Agent, or Firm—Schmeiser, Morelle & Watts

[57] ABSTRACT

A heat transfer element for cross flow heat exchanger consists of ceramic corrugated and planar plates. A plurality of the heat transfer elements are stacked up in such a manner that the direction of corrugation in adjacent elements intersects at right angles to form a heat transfer block for cross flow heat exchanger. Concave portions of corrugation, which confront soot-blowing flow for removing soot deposited onto the heat transfer surfaces of heat transfer block, are filled with ceramic solids. Also concave portions of corrugation corresponding to the corners, which abut the packings attached when the heat transfer block is installed on a casing, are filled with ceramic solids.

2 Claims, 5 Drawing Sheets

HEAT TRANSFER BLOCK FOR CROSS FLOW HEAT EXCHANGER

BACKGROUND OF THE INVENTION

No. 1 Field of the Invention

The invention relates to a structure of a corrugated ceramic heat transfer block for a cross flow heat exchanger.

No. 2 Description of the Prior Art

Conventionally cross flow heat exchangers utilizing corrugated ceramic heat transfer blocks have been used, wherein the heat transfer block utilized therein comprises heat transfer elements 10 each of which is made of a corrugated plate of ceramics 11 and a planar plate of ceramics 12 abutting each other, for example as shown in FIG. 4. As shown in FIG. 5, a plurality of heat transfer elements 10 are stacked in multi-layers so that the direction of corrugation of corrugated plate 11 in any element alternately intersects at a right angle that in an adjacent element, thereby forming a heat transfer block 20. Two kinds of fluids at different temperatures flow through the heat transfer block 20 in two directions shown by arrows A and B to exchange heat between each other.

FIG. 6 shows an example of a cross flow heat exchanger 30 which is constructed of a plurality of heat transfer blocks which are assembled and tightened after considering the flow rates and allowable pressure losses of fluids flowing therethrough. In this example, for instance, hot exhaust gas flows perpendicularly through the heat exchanger 30 in the direction of arrows E, E', while cold air flows hoizontally, as shown by arrows $C_1$, $C_2$, $C_3$ and $C_4$, through the heat exchanger 30, heat being exchanged therebetween.

When heat exchange is conducted between exhaust gas E and combustion air C using this cross flow heat exchanger, a portion of the exhaust gas is successively cooled to below its dew-point as a result of heat exchanger, wherein soot in the exhaust gas E is deposited on the heat transfer surface. Since soot accumulated in the course of operation lowers the amount of heat transferred, soot blowing is conducted from either the inlet or outlet of exhaust gas E, or from both the inlet and outlet of exhaust gas, to remove the deposited soot. Cold, warm or hot water, water vapor, etc. may be suitably selected as a soot blowing fluid J injected from a soot blowing pipe 21, as shown in FIG. 7, and soot removal is effected either by a separation action due to the temperature difference between the soot blowing fluid J and the soot/heat transfer surface, or by a separation action caused by an impacting force by the pressurized soot blowing fluid J which is injected from small holes and impinged upon the soot, the separation effect being generally thought to depend on the kind of fluid in the former separation action, and on the pressure and density of the fluid in the latter action.

Referring to FIG. 6, when the heat transfer blocks 20 are installed onto a casing 22, a heat transfer block holder 23 is used on each corner of the heat transfer block 20, and a packing 23a is interposed between the heat transfer block 20 and the heat transfer block holder 23.

The corrugated plate 11 and the planar plate 12 of the heat transfer element 10 shown in FIG. 4 are made of ceramic paper having a thickness of about 1 mm. If a soot blowing impact of 0.5 to 0.7 g/cm² is repeatedly applied by injecting soot blowing fluid J as shown in FIG. 7 for soot removal, repeating this impact about 400 times may cause throughholes 11C to develop in the top end of the corrugated plate 11, air for combustion being leaked through the holes 11C, thereby rendering heat exchange impossible and impairing the function as a heat exchanger.

On the other hand, referring to FIG. 6, since only the end 20a of ceramic paper sheet contacts the packing 23a of the heat transfer block 20, a tightening force is concentrated therein so that the end of the ceramic sheet is broken or corrugation collapses, thereby impairing sealing performance. If soft packing made of bundles of glass wool, ceramic paper or the like is used, the packing 23a comes to envelop embrace the end 20a of the heat transfer block 20 of corrugated ceramics, thereby making the contacting area larger and easing the concentration of tightening force. However, at the same time, exhaust gas and air for combustion pass through the interior of the packing, consequently impairing sealing capability.

BRIEF SUMMARY OF THE INVENTION

The invention seeks to provide a holding structure for a corrugated ceramic heat transfer block for a cross flow heat exchanger, in which the corrugated plates are not damaged by the impact of repeated soot blowing. The invention also seeks to provide a holding structure of ceramic heat transfer blocks, in which a tightening force on the contacting portion of packing of heat transfer block is dissipated to have better abutment of packing of heat transfer block.

DETAILED DESCRIPTION OF THE INVENTION

Figure 1:
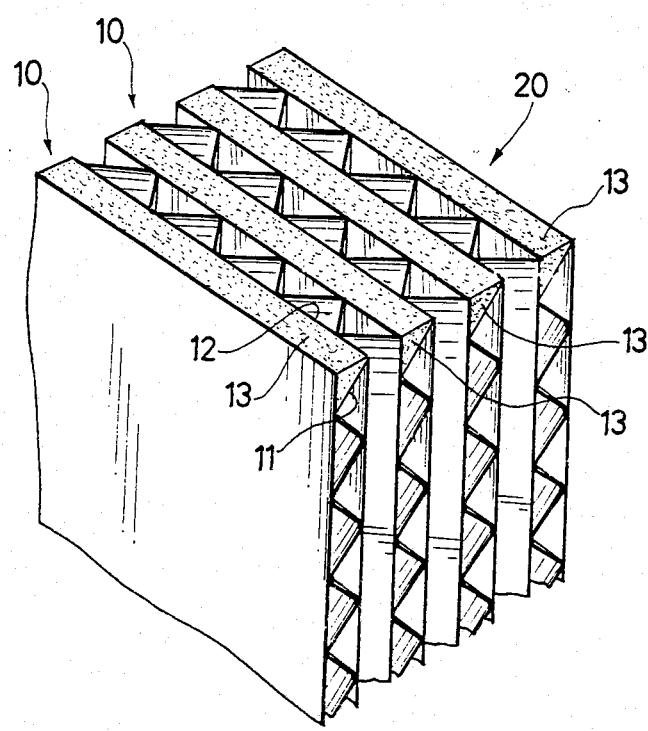
FIG. 1 is a perspective of an embodiment of the invention.

The invention provides, in one embodiment, a corrugated ceramic heat transfer block for cross flow heat exchanger in which a plurality of heat transfer elements each made of a ceramic corrugated plate and a planar plate are laid in multi-layers in such a manner that the direction of corrugation in adjacent elements intersects at right angles, characterized in that ceramic solids fill the concave portions of corrugation of the heat transfer block, said portions confronting the flow of soot blowing for removing soot which is deposited on the heat transfer surfaces of the heat transfer block. The invention provides, in another embodiment, a corrugated ceramic heat transfer block for a cross flow heat exchanger in which a plurality of heat transfer elements each made of a ceramic corrugated plate and a planar plate are laid in multi-layers in such a manner that the direction of corrugation in adjacent elements intersects at right angles, characterized in that ceramic solids fill the concave portion of corrugation at a corner abutting a packing which is attached when the heat transfer block is installed on a casing.

According to the invention, since ceramic solids fill the concave portions of the heat transfer block, corrugated ceramic paper in the heat transfer element is reinforced, thereby protecting ceramic paper from the impact of soot blowing, and since ceramic solids are filled in the corners of the heat transfer block which a packing abuts, a tightening force is dissipated when the heat transfer block is installed on a casing, thereby preventing damage to the heat transfer block.

The following performance characteristics are required for ceramic solids: first, waterproofness, acid-resistance, heat-resistance, and impact-resistance to soot blowing and thermal shock-resistance, and second, adhesiveness to heat transfer block when filled in small spaces and anti-shrinkage upon heating.

In the invention, the materials for ceramic solids are not definitely specified as long as they satisfy the performance characteristics required above, but preferably are mixtures of, for example, binding materials, aggregates, reinforcing fibers and viscosity increasing substances.

Binding materials are used for the binding of other materials and adhesion thereof to the walls of structures and preferably are silicate base binders such as silica gel, ethyl silicate and alkali silicate, and alumina sol, aluminum phosphate and similar materials.

Aggregates to be added for soot-blowing resistance, sealing, and other properties can be nonorganic powder commonly used such as calcium carbonate and clay, but preferably are siliceous powder such as silica stone or amorphous silica, C-glass flakes, mica, titanium oxide, zirconia powder or the like, particularly where acid-resistance is required.

Reinforcing fibers to be used for thermal shrinkage resistance and thermal shock resistance, can be C-glass fibers, potassium titanate fibers and walastonite, but preferably are C-glass fibers, silica glass fibers, anti-alkaline glassy fibers particularly where acid-resistance is required.

Viscosity-increasing substances to be added for preventing separation between binding material and aggregate and preventing flowing thereof after filling, are preferably methyl cellulose, carboxymethyl cellulose, polyethylene oxide, sodium alginate and other organics, or bentonite, clay and other inorganics.

Embodiments

The invention will be described hereunder by way of embodiments with reference to the accompanying drawings.

Figure 2:
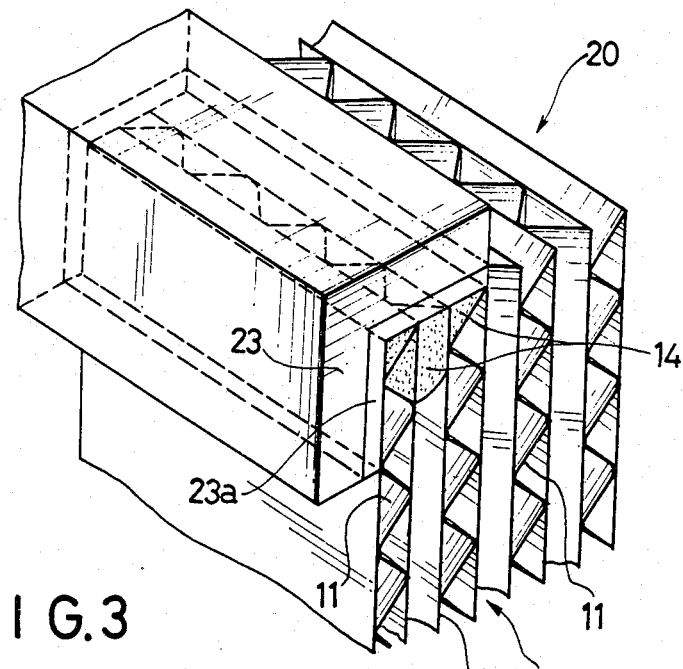
FIG. 2 is a perspective of another embodiment of the invention.
Figure 3:
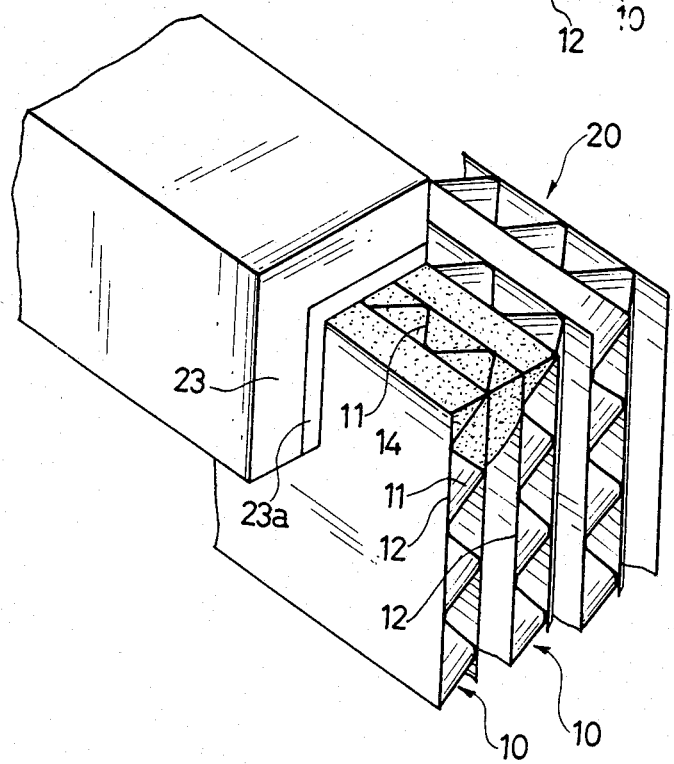
FIG. 3 is a partially cut away perspective of the embodiment in FIG. 2.
Figure 4:
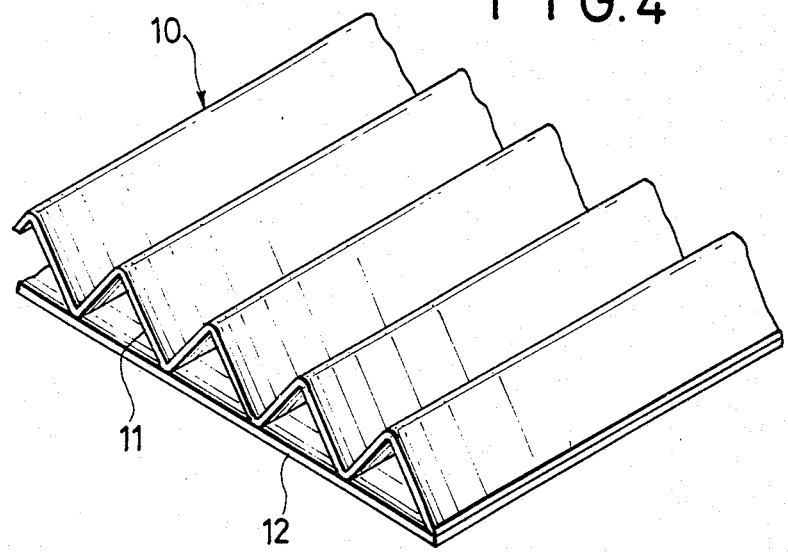
FIG. 4 is a perspective of a corrugated ceramic heat transfer element.
Figure 5:
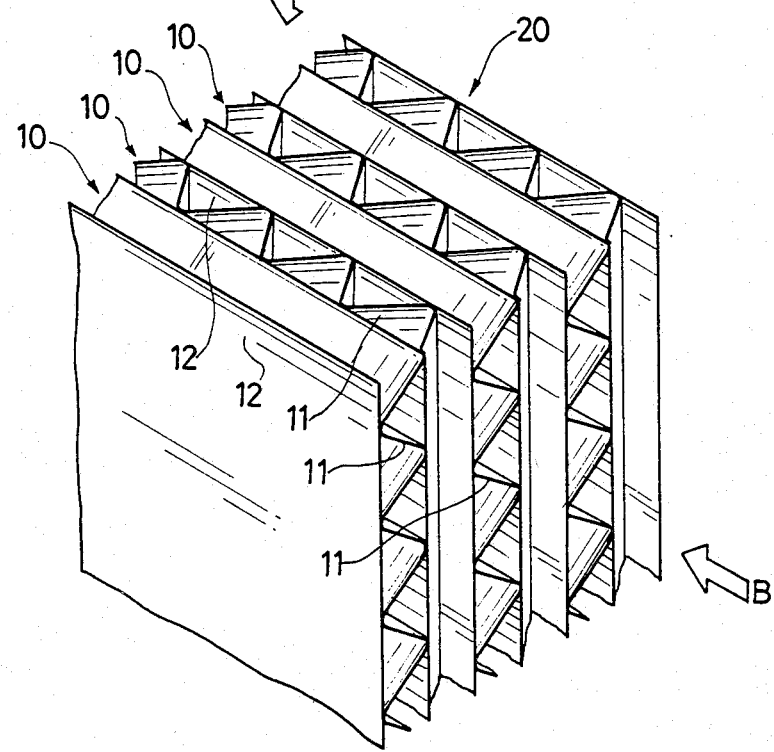
FIG. 5 is a perspective of a prior art heat transfer block.
Figure 6:
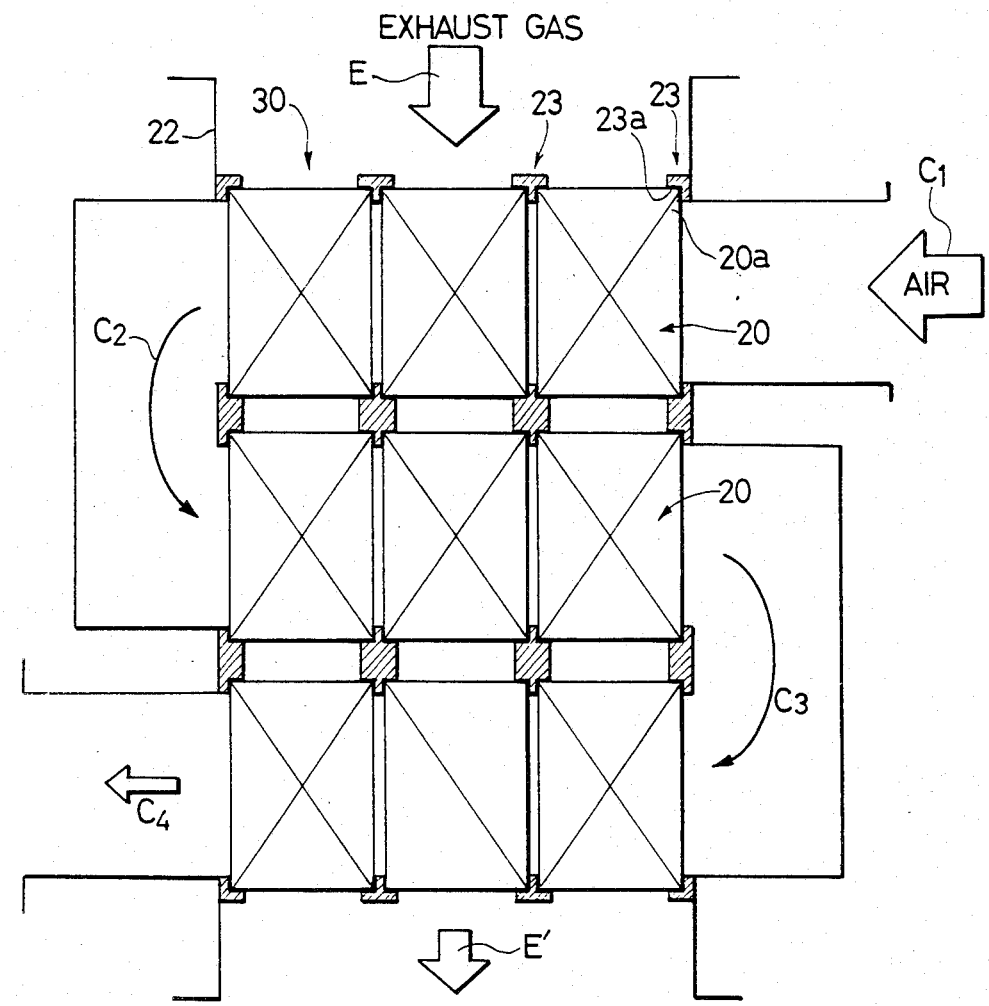
FIG. 6 is a front elevation of a cross flow heat exchanger.
Figure 7:
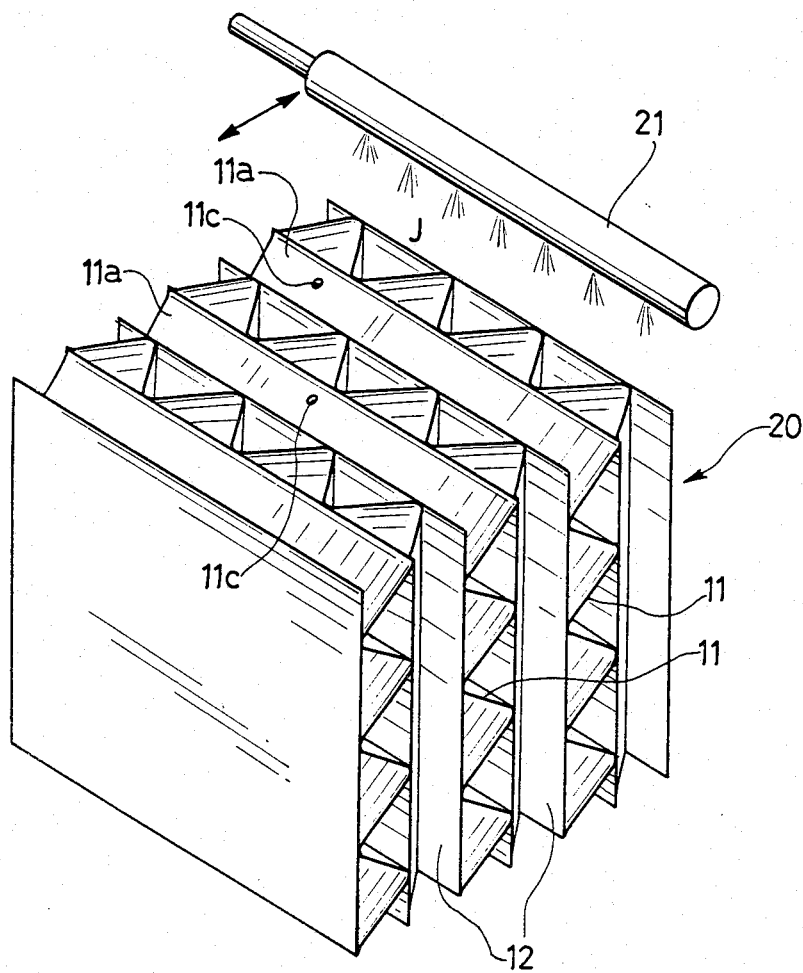
FIG. 7 is a perspective illustrating the soot blowing operation on a prior art heat transfer block.

FIG. 1 is a perspective of an embodiment of the invention. Since a ceramic corrugated plate 11 and a planar plate 12 of a heat transfer element 10 are similar to those described in reference to FIG. 4, and since the arrangement of the heat transfer elements in a heat transfer block is similar to that explained in reference to FIG. 5, further descriptions thereof are omitted herein. In the embodiment of the invention, as shown in FIG. 1, the cavity between the corrugated plate 11 and the planar plate 12 at the top of the heat transfer element 10 is filled with ceramic solids 13. The ceramic solids 13 are filled and fired during fabrication of corrugated ceramic heat transfer element 10 in this case. The construction protects the corrugated plate 11 from the impact of soot arising from soot blowing. Because of this arrangement, the corrugated plates 11 subject to impact did not show any damage even after the application of an impacting force of 0.5 to 0.7 g/cm² as many as two thousand (2000) times. Consequently, stronger soot blowing at a higher fluid supply pressure was made possible. It is better if the portions to be filled with ceramic solids are of gentle convex shape like a barrel roof or equilateral triangular shape of low height, and the solids overshoot the end of the element, FIGS. 2 and 3 are perspectives of another embodiment of the invention. Since the construction of heat transfer block 20, heat transfer elements 10, corrugated plates 11 and planar plates 12 in this embodiment are similar to those explained in reference to FIGS. 1 and 5, further details are omitted herein. A heat transfer block holder 23 as explained in reference to FIG. 6 is installed at each corner of a heat transfer block 20 with a packing 23a interposed therebetween, and a plurality of heat transfer blocks 20 are installed on a casing in the manner shown in FIG. 6. In the embodiment of the invention, ceramic solids 14 fill the space between the corrugated plate 11 and the planar plate 12 in each heat transfer element 10, that is, in the area where the heat transfer block 20 contacts the packing 23a. In this case, ceramic solids 14 are filled and fired during fabrication of the heat transfer element 10. Because of this construction, concentration of tightening force onto the end portion of ceramic paper sheet is eliminated, thereby preventing breakage of the end of ceramic paper sheet under that tightening force.

Further, the packing 23a used herein, in order to cover the rough surface of filled ceramic solids 14, is preferably foamed fluorine rubber sheet or the like having individual pores with a porosity of 60 to 70%, and being tightened to 1.5 kgf/cm².

Next, further specific embodiments of heat transfer blocks of the invention will be described hereunder. A paper sheet for treatment of 120 g/m² in weight and 1 mm in thickness was made, through a common process, from zirconium-containing glass fiber (commonly known as alkali-resistant glass or ARG fiber) and a polyvinyl-alcoholic resin base binder, and coated with silica powder of the rate of 300 g/m². This paper sheet was subjected to a common corrugating process, laminated and bonded together with the direction of corrugation (direction of fluid passage) interchanged by 90°, thereafter impregnated with hardener solution consisting of binder (colloidal silica) and aggregate (silica powder, C-glass flakes), dried to harden and fired, this process being repeated three times to form a cross flow ceramic heat transfer block of 300 mm cubed (300×300×300 mm).

This block had a wall thickness of 1.1 mm, flute height of 9 mm, pitch of 15 mm and density of 400 kg/m².

Next, the concave portions (non-flow passages) of corresponding corrugation on four faces of the heat transfer block were filled with ceramic solids consisting of a binder (colloidal silica), aggregate (silica powder, white carbon) and viscosity-increasing material (methyl cellulose) to form gentle convexes like a barrel roof, dried to harden and fired.

A number (N) of the blocks thus fabricated were installed on a casing with packing applied to each corner of each block, the packing being foamed fluoric rubber sheet of density 0.4 kg/cm³ with a width of 20 mm and thickness of 5 mm. The blocks were tightened from the exterior of casing to apply face pressure of 1 kgf/cm$^2$ to the packings.

The results of soot blowing tests and leakage tests with this heat transfer block were appreciably better than that of the prior art. The heat transfer block can also be made as follows:
(a) Zirconia-containing glass fiber can be replaced by C-glass fiber.
(b) The block of the embodiment can be further treated with resin of copolymer of tetrafluoroethylene-hexafluoropropylene (FEP).

According to the invention, ceramic solids were filled in the portions where impact or tightening force is applied in a corrugated ceramic heat transfer block for cross flow heat exchanger, thereby preventing the corrugated heat transfer block from soot-blowing damage during soot blowing and preventing breakage of the ends of ceramic paper sheet of heat transfer block.

As a number of wide variety of different embodiments of this invention may be made without departing from the spirit and scope thereof, it is to be understood that this invention is not limited to the specific embodiments thereof except as defined in the appended claims.

What is claimed is:

1. A corrugated ceramic heat transfer block for a linear cross flow heat exchanger, in which a plurality of heat transfer elements each composed of a ceramic corrugated plate member and a ceramic flat plate member is stacked in such a manner that the direction of corrugation in adjacent elements intersects at right angles, characterized in that concave portions of said corrugation of said heat transfer block, which confront a blowing fluid stream for removing soot deposited onto the heat transfer surfaces of said heat transfer block, are filled with ceramic solids, said concave portions being formed between said ceramic corrugated plate member and said ceramic flat plate member and extending at right angle to the soot-removing fluid stream flow direction, said ceramic solids being waterproof, acid-resistant, heat-resistant, resistant to impacts by said fluid stream, resistant to thermal shocks, adhesive to said heat transfer block when filled in small spaces and resistant to shrinkage upon heating.

2. A corrugated ceramic heat transfer block for a linear cross flow heat exchanger, in which a plurality of heat transfer elements each composed of a ceramic corrugated plate member and a ceramic flat plate member is stacked in such a manner that the direction of corrugation in adjacent elements intersects at right angles, characterized in that said transfer block is fitted with block corner holders having packings fitted at and abutting the corners of said transfer block and with spaces formed between said ceramic corrugated plate member and said ceramic flat plate member, said spaces being filled with ceramic solids that are water-proof, acid-resistant, heat-resistant, resistant to impacts by fluid-impinging streams, resistant to thermal shocks, adhesive to said heat transfer block when filled in small places and resistant to shrinkage upon heating.

* * * * *

UNITED STATES PATENT AND TRADEMARK OFFICE
CERTIFICATE OF CORRECTION

PATENT NO. : 4,789,585

DATED : December 6, 1988

INVENTOR(S) : Saito et al

It is certified that error appears in the above-identified patent and that said Letters Patent is hereby corrected as shown below:

On the first page of the patent document, at [30], Foreign Application Priority Data, change the Japanese priority document number from "61-1414196" to --61-141496--.

Signed and Sealed this

Eleventh Day of July, 1989

Attest:

DONALD J. QUIGG

*Attesting Officer*    *Commissioner of Patents and Trademarks*